72935     R. C. Sturges.
Imp'd Feed Bucket.
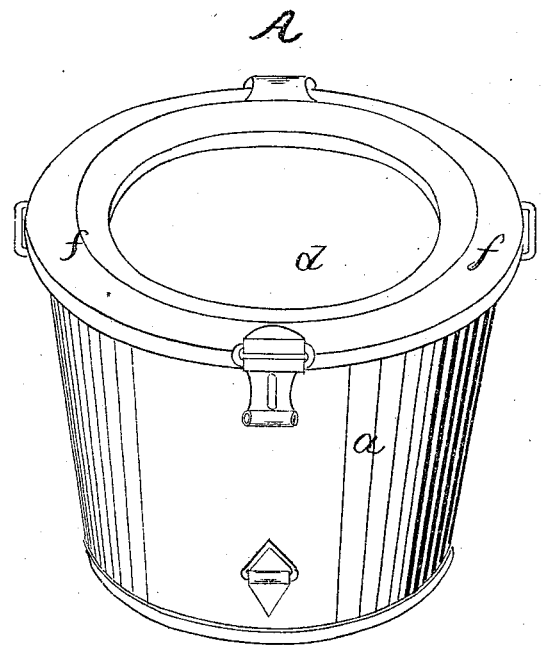
PATENTED
DEC 31 1867
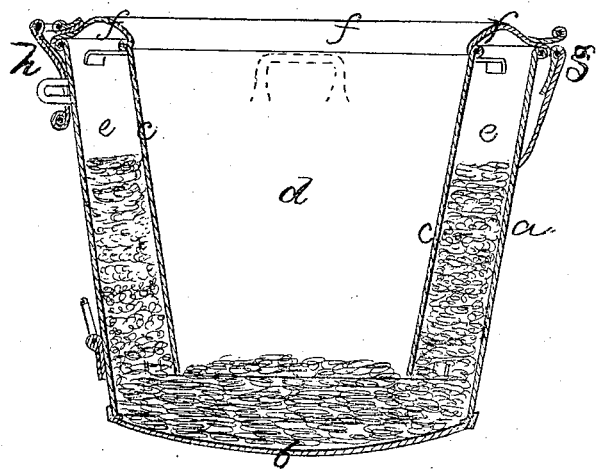
Witnesses
S. B. Kidder
M. W. Frothingham
R. C. Sturges,
by his Atty,

United States Patent Office.

R. C. STURGES, OF BARNSTABLE, MASSACHUSETTS.

Letters Patent No. 72,935, dated December 31, 1867.

---

IMPROVEMENT IN FEED-BUCKETS.

---

The Schedule referred to in these Letters Patent and making part of the same.

---

TO ALL WHOM IT MAY CONCERN:

Be it known that I, R. C. STURGES, of Barnstable, in the county of Barnstable, and State of Massachusetts, have invented an Improved Feed-Bucket; and I do hereby declare that the following, taken in connection with the drawings which accompany and form part of this specification, is a description of my invention sufficient to enable those skilled in the art to practise it.

My invention relates to the construction of feed-buckets for horses; my improvement consisting in making the bucket with a grain-chamber surrounding the central or feeding-chamber, from which it is separated by a partition, which is so disposed as to permit communication between the grain and eating-chambers at the bottom of the vessel, this construction keeping the feeding-chamber supplied with grain, but only in sufficient quantity for the animal to consume without wasting by throwing it from the bucket.

The drawings represent a feed-bucket embodying my improvement.

A shows a perspective view of the bucket; B a central section of the same. $a$ denotes the main body of the bucket, having a bottom, $b$, and rings or other devices for attachment of straps to confine the bucket upon the head of the animal to be fed. Within the body $a$ is a cylindrical partition, $c$, which divides the vessel into two parts, a centre chamber, $d$, and a surrounding chamber, $e$, these chambers being made to communicate at the bottom of the bucket by carrying the partition $c$ not quite down to the bottom, $b$. The outer chamber, $e$, constitutes a grain-box, and the inner chamber, $d$, a feeding-box, the one containing the supply of grain to be fed to the animal, and the bottom of the other constantly receiving grain from this supply as the horse, over whose mouth the feed-chamber is confined, eats into the supply; this supply being kept up by gravity, the grain flowing in from the outer chamber and supplying the place of the grain consumed from the centre chamber. The grain-chamber $e$ may be covered by a cap or ring, $f$, hinged upon one side of the bucket, as seen at $g$, and secured at the opposite side by a hasp and staple, as seen at $h$, this cap or cover being swung up when the grain-chamber is to be replenished with grain.

In charging the bucket, the grain is poured into the chamber $e$, and runs freely through into the centre chamber, until it rises up to the partition $c$, when the upper surface of the grain acts as a sort of valve, and prevents continued flow of the grain into the centre chamber, the chamber $e$ then being charged until full. The cover is then closed, and the bucket is ready to be fastened upon the head of the horse. As the grain is drawn away from the bottom of the vessel, the grain in chamber $e$ flows in, and continues so to flow, as the grain is eaten, until the supply in the grain-chamber $e$ is exhausted.

It will readily be seen that there is no large body of grain presented at any time to the reach of the mouth of the horse, and that he cannot, by throwing the bucket up, waste much if any of the grain by shaking it from the bucket.

I claim a feed-bucket, having an outer or grain-containing chamber, and an inner or feed-chamber connected together, and supplied, the latter from the former, substantially as set forth.

R. C. STURGES.

Witnesses:
 FRANCIS GOULD,
 L. H. LATIMER.